(12) United States Patent
Marathe et al.

(10) Patent No.: US 9,367,306 B2
(45) Date of Patent: Jun. 14, 2016

(54) METHOD FOR TRANSFORMING A MULTITHREADED PROGRAM FOR GENERAL EXECUTION

(75) Inventors: Jaydeep Marathe, Santa Clara, CA (US); Vinod Grover, Mercer Island, WA (US)

(73) Assignee: NVIDIA CORPORATION, Santa Clara, CA (US)

( * ) Notice: Subject to any disclaimer, the term of this patent is extended or adjusted under 35 U.S.C. 154(b) by 806 days.

(21) Appl. No.: 13/076,258

(22) Filed: Mar. 30, 2011

(65) Prior Publication Data

US 2012/0254875 A1    Oct. 4, 2012

(51) Int. Cl.
*G06F 9/46* (2006.01)
*G06F 9/44* (2006.01)
*G06F 9/52* (2006.01)

(52) U.S. Cl.
CPC . *G06F 8/72* (2013.01); *G06F 9/522* (2013.01)

(58) Field of Classification Search
None
See application file for complete search history.

(56) References Cited

U.S. PATENT DOCUMENTS

2001/0020293 A1* 9/2001 Uchihira et al. ............... 717/4
2011/0314442 A1* 12/2011 Bondhugula et al. ......... 717/106

OTHER PUBLICATIONS

MCUDA: An Efficient Implementation of CUDA Kernels for Multi-core CPUs, 2008, Stratton et al.*

* cited by examiner

*Primary Examiner* — Mengyao Zhe
(74) *Attorney, Agent, or Firm* — Artegis Law Group, LLP

(57) ABSTRACT

A technique is disclosed for executing a program designed for multi-threaded operation on a general purpose processor. Original source code for the program is transformed from a multi-threaded structure into a computationally equivalent single-threaded structure. A transform operation modifies the original source code to insert code constructs for serial thread execution. The transform operation also replaces synchronization barrier constructs in the original source code with synchronization barrier code that is configured to facilitate serialization. The transformed source code may then be conventionally compiled and advantageously executed on the general purpose processor.

22 Claims, 7 Drawing Sheets

```
__global__ void kern(void)                         306
{
    current_restart = 0;
    next_restart = 0;
    // while not all threads have reached exit
    while (next_restart != -1)    ← While Loop
    {                                320
        current_restart = next_restart;
        for (tid = 0; tid < numThreads; ++tid)
        {
            switch (current_restart)    For Loop
            {                           324
                case 0:
                    goto label_start;
                case 1:                 Switch
                    goto label_past_syncthread_0;  Statement
                case 2:                 322
                    goto label_past_synchthread_1;
            }
            label_start:
            tIdVar = tid;
            ... program code 1 ...
        ┌→ next_restart = 1;
Barrier │   //__syncthreads();  ← Synchronization
Code   ┤ → goto thread_end_label;       Barrier
330     │ → label_past_synchthread_0:     310
        └   ... program code 2 ...
            if (condition)
            {
        ┌→ next_restart = 2;
Barrier │   //__synchthreads();  ← Synchronization
Code   ┤ → goto thread_end_label;       Barrier
332     │ → label_past_synchthread_1:     312
        └ }
            ... program code 3 ...
            next_restart = -1;
            label_end:
            thread_end_label:
        } // for
    } // while
}
```

```
__global__ void kern(void)
{
    tIdVar = threadIdx.x;
    ... program code ...
    if (condition)
    {
        return;
    }
}
```

```
__global__ void kern(void)
{
    for (tid = 0; tid < numThreads; ++tid)
    {
        tIdVar = tid;
        ... program code ...
        if (condition)
        {
            goto loop_end_label1;
        }
        loop_end_label1:
    }
}
```

```
                                                    ← 304
__global__ void kern(void)
{
   label_start:
   tIdVar = threadIdx.x;
   ... program code 1 ...
   __syncthreads();  ←————————— Synchronization Barrier
   ... program code 2 ...                              310
   if (condition)
   {
       __synchthreads();  ←————————— Synchronization Barrier
   }                                                   312
   ... program code 3 ...
   label_end:
}
```

Figure 3C

```
                                                          ┌─ 306
            __global__ void kern(void)
            {
               current_restart = 0;
               next_restart = 0;
               // while not all threads have reached exit
               while (next_restart != -1)  ◄──────────── While Loop
               {                                          320
                  current_restart = next_restart;
                  for (tid = 0; tid < numThreads; ++tid)
                  {
                     switch (current_restart)
                     {                                    For Loop
                        case 0:                           324
                           goto label_start;
                        case 1:                           Switch
                           goto label_past_syncthread_0;  Statement
                        case 2:                           322
                           goto label_past_synchthread_1;
                     }
                     label_start:
                     tIdVar = tid;
                     ... program code 1 ...
              ┌───► next_restart = 1;
     Barrier  │     //__syncthreads();  ◄──────── Synchronization
      Code   ─┼───► goto thread_end_label;         Barrier
      330     │     label_past_synchthread_0:      310
              └───► ... program code 2 ...
                    if (condition)
                    {
              ┌───► next_restart = 2;
     Barrier  │     //__synchthreads();  ◄──────── Synchronization
      Code   ─┼───► goto thread_end_label;         Barrier
      332     │     label_past_synchthread_1:      312
              └───► }
                    ... program code 3 ...
                    next_restart = -1;
                    label_end:
                    thread_end_label:
                  } // for
               } // while
            }
```

Figure 3D

METHOD FOR TRANSFORMING A MULTITHREADED PROGRAM FOR GENERAL EXECUTION

BACKGROUND OF THE INVENTION

1. Field of the Invention

The invention relates generally to compiler systems and, more specifically, to a method for transforming a multi-threaded program for general execution.

2. Description of the Related Art

Certain computer systems include a parallel processing subsystem that may be configured to concurrently execute plural program threads that are instantiated from a common program. Such systems are referred to in the art as having single program multi-data (SPMD) parallelism. CUDA is a programming model known in the art that implements SPMD execution on parallel processing subsystems. An application program written for CUDA may include sequential C language programming statements, and calls to a specialized application programming interface (API) used for configuring and managing parallel execution of program threads. A function within a CUDA application that is destined for concurrent execution on a parallel processing subsystem is referred to as a "kernel" function. An instance of the kernel is referred to as a thread, and a set of concurrently executing threads are organized as a thread block. A set of thread blocks may further be organized into a grid. Each thread is identified by an implicitly defined set of index variables. Each thread may access their instance of the index variables and act independently with respect to other threads based on the index variables. For example, CUDA defines a 3-tuple of index variables for thread position within a block, and a 2-tuple of index variables for thread position within a grid.

Based on a specific set of index variables, a given thread may independently access memory or other system resources with variable latency, leading to certain threads advancing further in execution than other threads. However, certain algorithms require coherent state among different threads at certain synchronization points before processing may advance. To enable proper synchronization among threads, CUDA provides synchronization barriers, whereby if any thread calls a certain synchronization primitive, all threads within a related group of concurrent threads must call the same synchronization primitive before any thread may advance past the synchronization primitive. In this way, related threads at different stages of execution may synchronize their execution stage before advancing.

In certain scenarios a user may wish to execute an existing SPMD application, such as a CUDA application, on a general purpose central processing unit (CPU) rather than on a parallel processing subsystem. Unfortunately, conventional CPUs are typically configured to execute only a limited number of independent concurrent threads, and conventional operating systems that support execution of a larger number of threads typically map each thread to an independent process, requiring burdensome context switches to perform thread synchronization at synchronization barriers. Therefore, directly mapping threads for a CUDA program to a set of equivalent threads in a general purpose processing environment represents an unacceptably inefficient approach to executing a CUDA program on a general purpose CPU.

As the foregoing illustrates, what is needed in the art is a technique for efficiently executing an SPMD application on a general purpose CPU.

SUMMARY OF THE INVENTION

One embodiment of the present invention sets forth a method for executing a multi-threaded program on a single-threaded processor core, comprising identifying a kernel function included within the multi-threaded program, enumerating a plurality of barrier synchronization calls within the kernel function, modifying the kernel function by replacing each enumerated barrier synchronization call within the kernel function with a plurality of barrier commands and inserting a plurality of execution control commands into the kernel function, and transferring the modified kernel function to a transformed source file.

Other embodiments of the present invention include, without limitation, a computer-readable storage medium including instructions that, when executed by a processing unit, cause the processing unit to perform the techniques described herein as well as a computing device that includes a processing unit configured to perform the techniques described herein.

One advantage of the disclosed technique is that programs structured for multi-threaded execution on a parallel processing subsystem may be efficiently and advantageously executed instead on a general purpose processor.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3C illustrates a kernel function having synchronization barriers;

FIG. 3D illustrates a parallel to serial transform on the kernel function, according to one embodiment of the present invention;

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

System Overview

Figure 1:
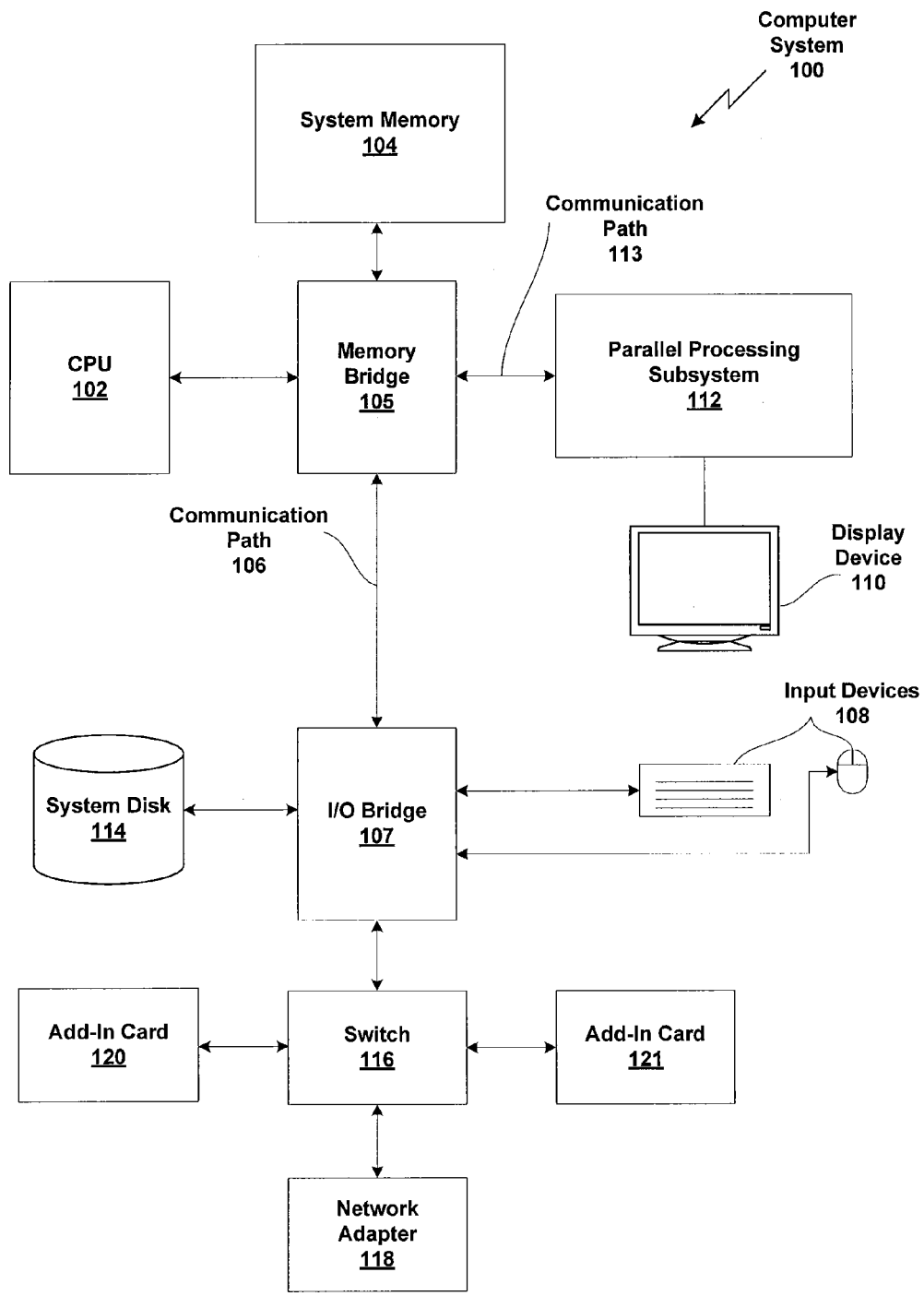
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 configured to communicate via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A graphics driver 103 may be configured to send graphics primitives over communication path 113 for parallel processing subsystem 112 to generate pixel data for display on display device 110. A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Certain embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
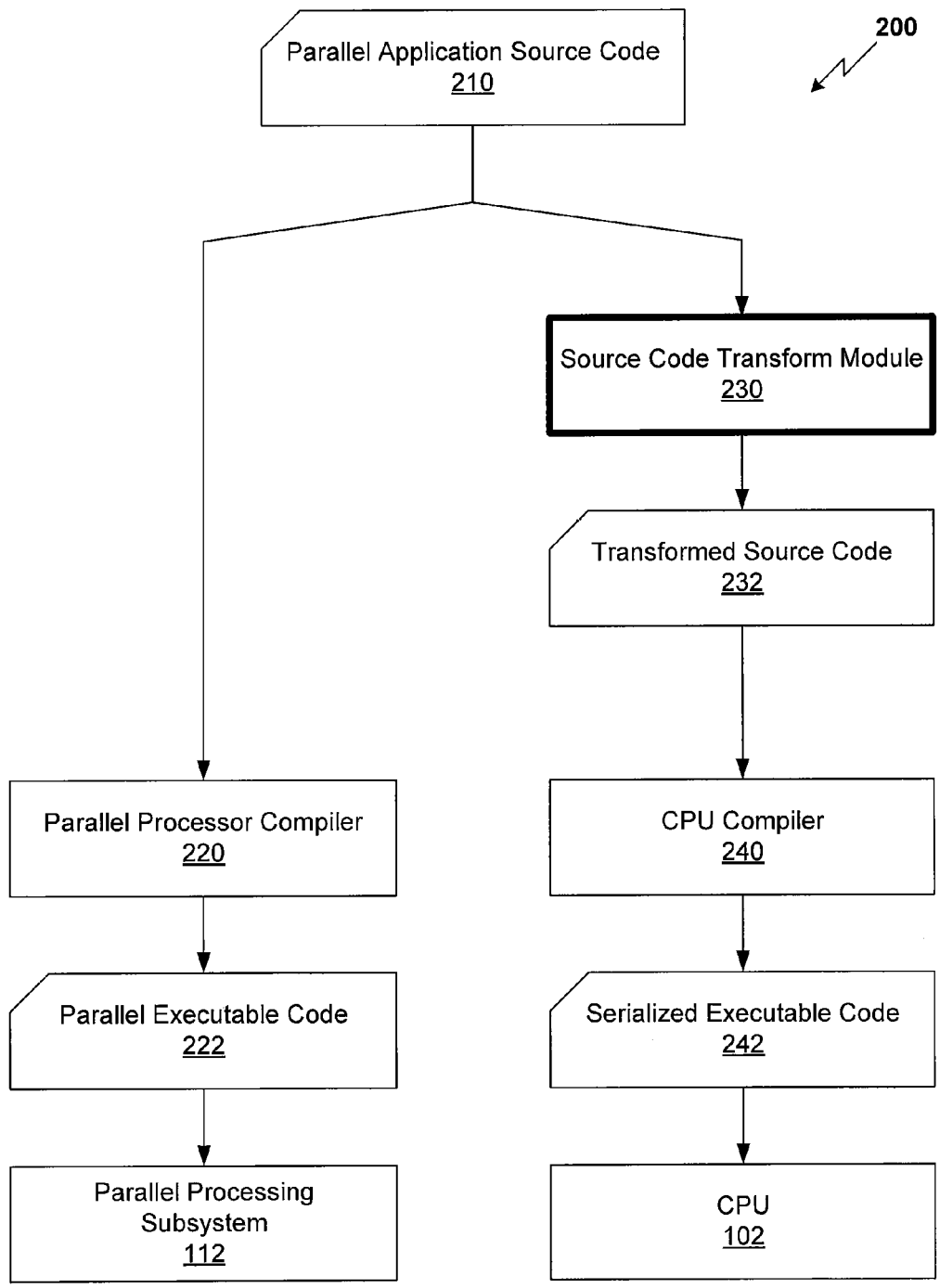
FIG. 2 illustrates a compilation tool flow for generating parallel executable code and serialized executable code from a common set of parallel application source code, according to one embodiment of the present invention.

FIG. 2 illustrates a compilation tool flow 200 for generating parallel executable code 222 and serialized executable code 242 from a common set of parallel application source code 210, according to one embodiment of the present invention. The parallel program source code 210 includes, without limitation, programming instructions for at least one kernel function written to execute as a plurality of threads that are each an instance of the kernel function.

The parallel processor compiler 220 is configured to conventionally compile the parallel application source code 210 into parallel executable code 222. The parallel executable code 222 may be loaded into the parallel processing subsystem 112 of FIG. 1 for execution. Any synchronization barriers within the parallel executable code 222 are implemented using native constructs available within the parallel processing subsystem 112. The compilation flow from parallel application source code 210 through parallel execution of the at least one kernel function on the parallel processing subsystem 112 represents a conventional approach to executing a parallel application defined by the parallel application source code 210.

Embodiments of the present invention define a compilation flow and code transformation techniques that enable the parallel application source code 210 to efficiently execute as a single thread on the general purpose CPU 102 rather than plural threads on the parallel processing subsystem 112. A source code transform module 230, described in greater detail below, transforms the parallel application source code 210 to generate transformed source code 232. Parallelism inherent within the parallel application source code 230 is serialized for execution on general purpose CPU 102. Furthermore, synchronization barriers within the parallel application source code 210 are transformed for serial execution. Serialization transforms applied to the parallel application source code 210 produces a transformed source code 232 that is generic, single threaded, and suitable for conventional compilation and execution. The CPU compiler 240 conventionally compiles the transformed source code 232 to generate serialized executable code 242, which is suitable for serial execution on the general purpose CPU 102.

Figures 3A, 3B:
FIG. 3A illustrates a basic kernel function.
FIG. 3B illustrates a parallel to serial transform on the kernel function, according to one embodiment of the present invention.

FIG. 3A illustrates a basic kernel function 302. As shown, the kernel function 302 named "kern" includes arbitrary program code, and reads an implicitly defined index variable "threadIdx.x." The index variable is assigned to an arbitrary local variable tldVar. Under a conventional execution model, function kern( ) 302 executes as a specified number of concurrently executing thread instances. Certain behaviors of each thread instance may be determined by a unique value of tldVar.

FIG. 3B illustrates a parallel to serial transform on the kernel function 302, according to one embodiment of the present invention. Parallel execution associated with function kern( ) 302 is serialized via the "for" loop, configured to execute the program code associated with the function kern( ) over a range of values for tid from zero to numThreads. The range of values for tid corresponds to a number of concurrent instances of kern( ) that would conventionally execute in a parallel execution regime. The value of tid is assigned to local variable tldVar. A return operation is mapped to a goto command that advances the for-loop. Completion of the for-loop is analogous to every thread instance completing execution. Persons skilled in the art will recognize that, upon completion, state data computed by the kern( ) function executing in the parallel processing subsystem 112 is identical to state data computed by the serialized version of kern( ) execution in CPU 102.

FIG. 3C illustrates a kernel function 304 having synchronization barriers. As shown, the kernel function named "kern" includes three sections of arbitrary program code ("program code 1" through "program code 3"), and two synchronization barriers 310, 312 that use a "_synchthreads( )" construct, which blocks until all threads associated with a given group of concurrent threads reach the same place in execution and also call_synchthreads( ). Persons skilled in the art will understand that language semantics for CUDA require that either all threads or no threads within a group of concurrent threads eventually encounter a given_synchthreads( ) call. An initial label "label_start:" marks a starting point for execution of function kern( ), while "label_end:" marks an ending point for execution of function kern( ).

FIG. 3D illustrates a parallel to serial transform on the kernel function 304, according to one embodiment of the present invention. The parallel to serial transform comprises modifying original source code for kernel function kern( ) 304 to generate transformed source code 306. The transformed source code 306 is structured to sequence execution of sections of code disposed between synchronization barriers 310, 312 over individual thread instances within a group of concurrent threads. Thread serialization is achieved by for-loop 324, which sequences execution of each concurrent thread over a range of values for variable tid. The range of values corresponds to a specified number of concurrent threads that should execute. Each concurrent thread is an instance of kern( ) that would execute concurrently in a parallel execution regime. Synchronization barrier serialization is achieved by while-loop 320 and switch statement 322. Serial execution proceeds first over all concurrent threads for "program code 1" only. Execution then proceeds over all concurrent threads for "program code 2" only. Finally, execution proceeds over all concurrent threads for "program code 3" only. Persons skilled in the art will recognize that this serialized execution for program code 1-3, is equivalent to a parallel execution of program code 1-3 with synchronization barriers.

The transform partitions execution of kern( ) along boundaries defined by synchronization barriers 310, 312, and serializes execution of kern by thread number, given by variable tid. The while-loop 320 controls which section of program code 1-3 is currently executed by for-loop 324, which controls which thread index variable (or variables) is presented to the program code program code 1-3 . The for-loop 324 is structured as a scalar value (tid) that sequences through each concurrent thread. However, multi-dimensional indices may also be used as a thread identifier in a conventional kernel function. Any technically feasible technique may be used to map the scalar value of tid to a multi-dimensional set of index variables. In one embodiment, tid may be used as an index into a set of arrays, with each array comprising a list of corresponding index variable values. For example, CUDA typically identifies a thread according to a 3-tuple block identifier, and a 2-tuple grid identifier. The value of tid may be used as an index into an array structure that returns an appropriate 3-tuple, and an array structure that returns an appropriate 2-tuple for use within a kernel function.

The transform includes, without limitation, inserting execution sequence variables "current_restart" and "next_restart," while-loop 320, an assignment to current_restart from next_restart, for-loop 324, switch statement 322, and synchronization barrier code 330, 332 in place of each synchronization barrier 310, 312.

The synchronization barrier code 330, 332 comprises an assignment statement, a barrier goto statement, and a barrier label statement. The assignment statement assigns a value for next_restart that corresponds to a specific case number within the switch statement 322. The case number is associated with a goto command within the switch statement 322 that targets the barrier label statement. The barrier label statement marks a location in the transformed source code 306 where execution should commence after each thread has executed and reached the same barrier code. The barrier goto statement is located before the barrier label statement. The barrier goto statement serves to advance one iteration of the for-loop 324, which is analogous to transitioning execution to a subsequent thread.

Figure 3E:
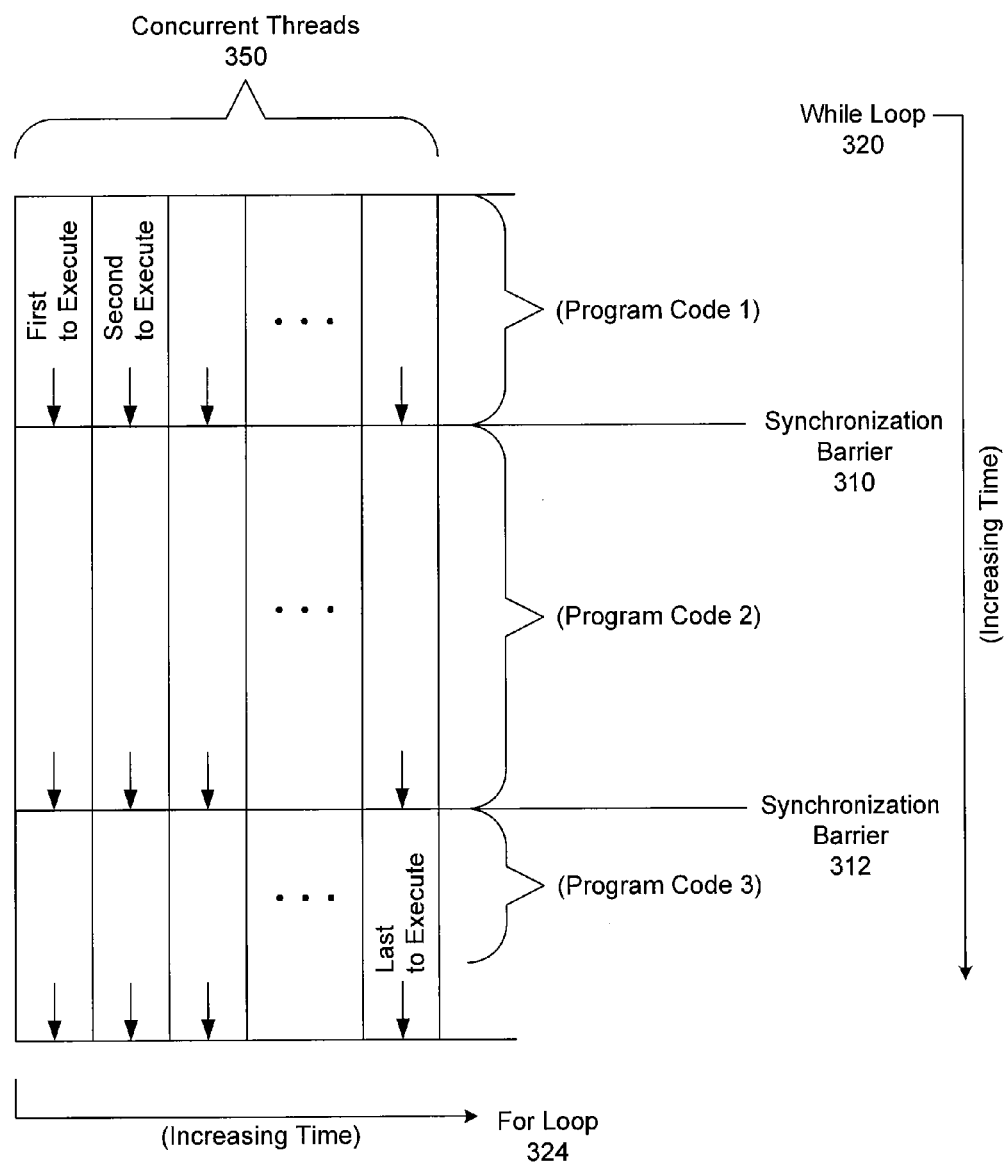
FIG. 3E illustrates execution of transformed source code, according to one embodiment of the present invention.

FIG. 3E illustrates execution of transformed source code 306, according to one embodiment of the present invention. The while-loop 320 of FIG. 3D represents an outer execution loop, and the for-loop 324 represents a nested execution loop within the while-loop 320. Concurrent threads 350 represent a group of threads that would conventionally execute concurrently on the parallel processing subsystem 112 of FIG. 1, but are instead executing sequentially on CPU 102. In this example, the transformed source code 306 comprises code segments program code 1, program code 2, and program code 3. Program code 1 executes once for each instance of the concurrent threads 350 before reaching synchronization barrier 310. The for-loop 324 sequentially executes program code 1 for each thread instance, thereby emulating parallel execution of the concurrent threads 350. Similarly, program code 2 executes once for each thread of the concurrent threads 350 before reaching synchronization barrier 312. Program code 3 also executes once for each thread of the concurrent threads 350 before terminating. Persons skilled in the art will recognize that synchronization barrier 310 may be disposed within a loop structure or nested loop structures of the original source code for kernel function kern( ) 304, and that the transform taught herein will accommodate correct execution of the loop structure or structures. For example, a for-loop structure that includes a synchronization barrier would partially execute in program code 1 and partially execute in program code 2. The transformed source code 306 in this example would include synchronization barrier code, such as barrier code 330, 332 described previously in FIG. 3D, which would yield correct results.

Figure 4:
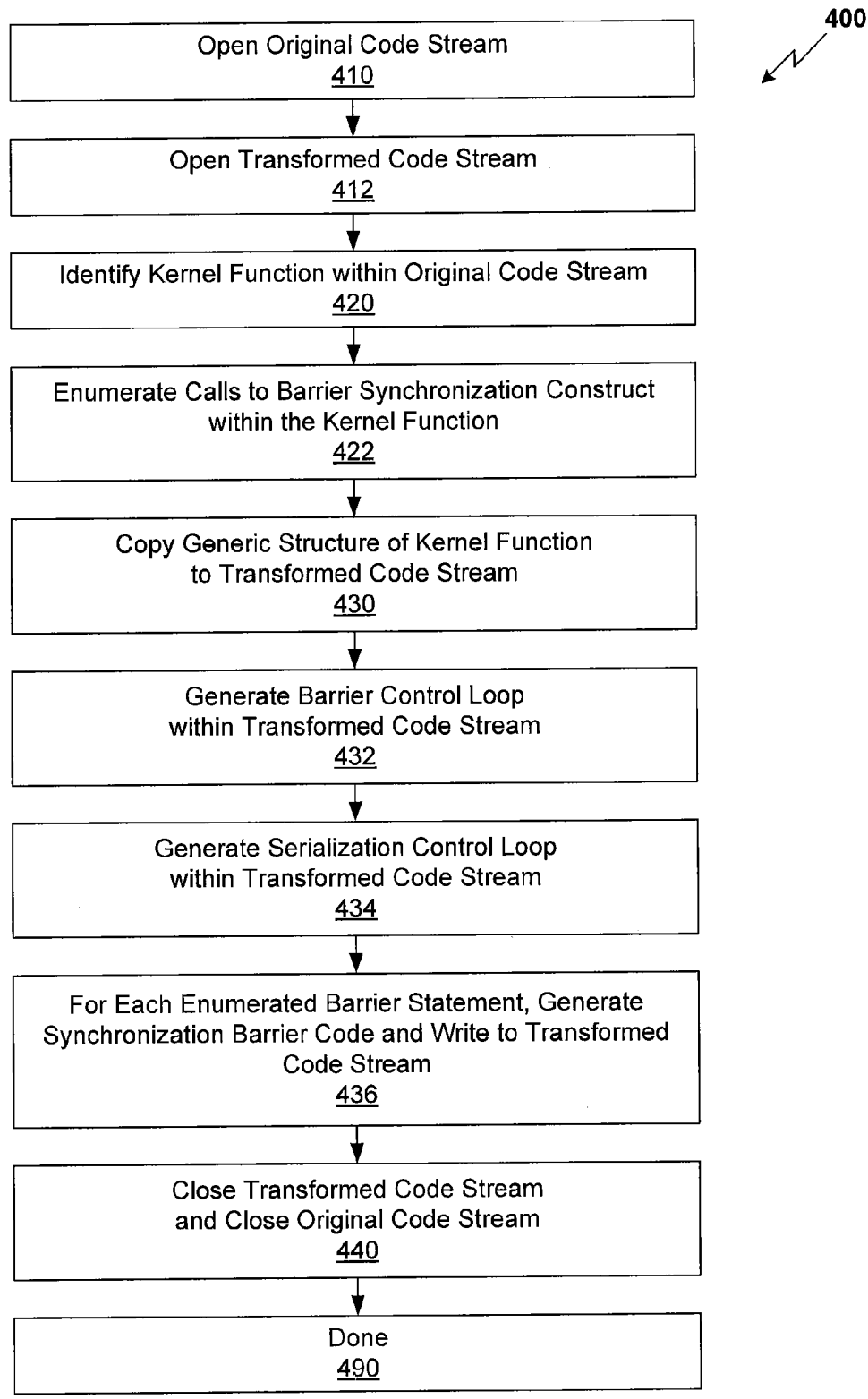
FIG. 4 sets forth a flowchart of method steps for transforming a parallel kernel function to a serialized kernel function, according to one embodiment of the present invention.

FIG. 4 sets forth a flowchart of method steps 400 for transforming a parallel kernel function to a serialized kernel function, according to one embodiment of the present invention. Although the method steps are describe in conjunction with the systems of FIGS. 1-2, persons skilled in the art will understand that any system configured to perform the method steps, in any order, is within the scope of the present invention.

The method begins in step 410, where a transform module, such source code transform module 230 of FIG. 2, opens a code stream for original source code, such as parallel application source code 210. In one embodiment, the transform module comprises a software application executing on computer system 100. The original source code includes a kernel function designed for multi-threaded execution. The original code stream may be opened using any technically feasible technique and from any technically feasible storage medium. For example, the original code stream may be opened from a data file stored within system disk 114. In step 412, the transform module opens a transformed code stream, such as transformed source code 232. In one embodiment, the transformed code stream comprises a file within system disk 114.

In step 420, the transform module identifies a kernel function within the original code stream. The kernel function, such as kernel function 304, is designed for concurrent execution on a parallel processing subsystem. In step 422, the transform module enumerates all calls to barrier synchronization constructs within the kernel function.

In step 430, the transform module copies a generic structure of the kernel function to the transformed code stream. The generic structure includes programming code not subject to modification by the transform module. In step 432, the transform module generates a barrier control loop within the transformed code stream. The barrier control loop comprises the while-loop 320 of FIG. 3D, and related statements. In step 434, the transform module generates a serialization control loop within the transformed code stream. The serialization control loop comprises the for-loop 324, the switch statement 322, and related statements. In step 436, for each enumerated barrier statement, the transform module generates and configures an instance of synchronization barrier code and writes the code to the transformed code stream. In step 440, the transform module closes the transformed code stream and closes the original code stream. The method terminates in step 490.

In sum, a technique for transforming a multi-threaded program into a single-threaded program for execution on a general purpose processor is disclosed. Original source code for the multi-threaded program is transformed to generate transformed source code, which may be compiled for execution on the general purpose processor. The transform modifies the original source code to serialize execution over a specified number of thread instances. The original source code is also partitioned along synchronization barriers, and each call to a synchronization barrier construct is replaced with synchronization barrier code that facilitates serialized execution. The transformed source code includes an outer loop structure that controls execution points related to the synchronization barrier code, and an inner loop that sequentially executes a portion of code for each thread instance. The portion of code is disposed between synchronization barriers. Efficient execution is achieved because overhead related to serialization is limited to basic flow control constructs that guide serial execution.

One advantage of the disclosed technique is that programs structured for multi-threaded execution on a parallel processing subsystem may be efficiently and advantageously executed instead on a general purpose processor.

While the foregoing is directed to embodiments of the invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the invention.

In view of the foregoing, the scope of the invention is determined by the claims that follow.

What is claimed is:

1. A computer-implemented method for executing a multi-threaded program on a single-threaded processor core, the method comprising:
   identifying a kernel function included within the multi-threaded program;
   enumerating a plurality of barrier synchronization calls within the kernel function;
   modifying the kernel function by replacing each enumerated barrier synchronization call within the kernel function with a plurality of barrier commands and inserting a plurality of execution control commands into the kernel function, wherein the plurality of execution control commands includes a switch command within a nested loop, the switch command configured to include a different case for each of the enumerated barrier synchronization calls; and
   transferring the modified kernel function to a transformed source file.

2. The method of claim 1, wherein the execution control commands comprise at least one of a while-loop, a nested for-loop, and a switch command within the nested for-loop.

3. The method of claim 2, wherein the while-loop is configured to execute one iteration for each enumerated barrier synchronization call within the kernel function.

4. The method of claim 3, wherein the nested for-loop is configured to execute a number of times within each iteration of the while-loop equal to the number of threads that are supposed to execute the kernel function concurrently.

5. The method of claim 4, wherein the switch command includes a different case for each enumerated barrier synchronization call within the kernel function.

6. The method of claim 5, wherein the execution control commands further comprise a first variable configured to store a current starting point for execution, and second variable configured to store a next starting point for execution, and wherein the first variable and the second variable are updated for each iteration of the while-loop.

7. The method of claim 6, wherein the barrier commands related to a particular enumerated barrier synchronization call within the kernel function comprise an assignment to the second variable corresponding to an enumeration number for a barrier label, a thread-end goto command, and the barrier label.

8. The method of claim 7, wherein the enumeration number corresponds to a case in the switch command associated with the particular enumerated barrier synchronization call within the kernel function and having an associated goto command that targets the barrier label.

9. The method of claim 7, wherein the thread-end goto command jumps to a label in the nested for-loop that advances the nested for-loop by one iteration.

10. The method of claim 1, further comprising compiling at least the transformed source file to generate an executable object for execution on the single-threaded processor core.

11. A non-transitory computer-readable storage medium including instructions that, when executed by a processing unit, cause the processing unit to execute a multi-threaded program on a single-threaded processor core, by performing the steps of:
    identifying a kernel function included within the multi-threaded program;
    enumerating a plurality of barrier synchronization calls within the kernel function;
    modifying the kernel function by replacing each enumerated barrier synchronization call within the kernel function with a plurality of barrier commands and inserting a plurality of execution control commands into the kernel function, wherein the plurality of execution control commands includes a switch command within a nested loop, the switch command configured to include a different case for each of the enumerated barrier synchronization calls; and transferring the modified kernel function to a transformed source file.

12. The non-transitory computer-readable storage medium of claim 11, wherein the execution control commands comprise at least one of a while-loop, a nested for-loop, and a switch command within the nested for-loop.

13. The non-transitory computer-readable storage medium of claim 12, wherein the while-loop is configured to execute one iteration for each enumerated barrier synchronization call within the kernel function.

14. The non-transitory computer-readable storage medium of claim 13, wherein the nested for-loop is configured to execute a number of times within each iteration of the while-loop equal to the number of threads that are supposed to execute the kernel function concurrently.

15. The non-transitory computer-readable storage medium of claim 14, wherein the switch command includes a different case for each enumerated barrier synchronization call within the kernel function.

16. The non-transitory computer-readable storage medium of claim 15, wherein the execution control commands further comprise a first variable configured to store a current starting point for execution, and second variable configured to store a next starting point for execution, and wherein the first variable and the second variable are updated for each iteration of the while-loop.

17. The non-transitory computer-readable storage medium of claim 16, wherein the barrier commands related to a particular enumerated barrier synchronization call within the kernel function comprise an assignment to the second variable corresponding to an enumeration number for a barrier label, a thread-end goto command that advances the nested for-loop by one iteration, and the barrier label.

18. The non-transitory computer-readable storage medium of claim 17, wherein the enumeration number corresponds to a case in the switch command associated with the particular enumerated barrier synchronization call within the kernel function and having an associated goto command that targets the barrier label.

19. The non-transitory computer-readable storage medium of claim 11, further comprising compiling at least the transformed source file to generate an executable object for execution on the single-threaded processor core.

20. A computing device, comprising:
a mass storage system configured to store at least a multi-threaded program and a transformed source file;
a processing unit coupled to the mass storage system and configured to:
identify a kernel function included within the multi-threaded program;
enumerate a plurality of barrier synchronization calls within the kernel function;
modify the kernel function by replacing each enumerated barrier synchronization call within the kernel function with a plurality of barrier commands and inserting a plurality of execution control commands into the kernel function, wherein the plurality of execution control commands includes a switch command within a nested loop, the switch command configured to include a different case for each of the enumerated barrier synchronization calls; and
transfer the modified kernel function to the transformed source file.

21. The computing device of claim 20, wherein the execution control commands comprise at least one of a while-loop, a nested for-loop, and a switch command within the nested for-loop that is configured to include a different case for each enumerated barrier synchronization call within the kernel function.

22. A computing device, comprising:
a mass storage system configured to store at least a multi-threaded program and a transformed source file;
a processing unit coupled to the mass storage system and configured to:
identify a kernel function included within the multi-threaded program;
enumerate a plurality of barrier synchronization calls within the kernel function;
modify the kernel function by replacing each enumerated barrier synchronization call within the kernel function with a plurality of barrier commands and inserting a plurality of execution control commands into the kernel function, wherein the execution control commands comprise at least one of a while-loop, a nested for-loop, and a switch command within the nested for-loop that is configured to include a different case for each enumerated barrier synchronization call within the kernel function, and wherein the plurality of barrier commands relate to a particular enumerated barrier synchronization call within the kernel function comprise:
an assignment to a variable corresponding to an enumeration number for a barrier label;
a thread-end goto command; and
the barrier label; and
transfer the modified kernel function to the transformed source file.

\* \* \* \* \*